United States Patent [19]
Ando

[11] Patent Number: 4,710,817
[45] Date of Patent: Dec. 1, 1987

[54] SOLID STATE IMAGE SENSOR

[75] Inventor: Fumihiko Ando, Tokyo, Japan

[73] Assignee: Nippon Hoso Kyokai, Tokyo, Japan

[21] Appl. No.: 900,139

[22] PCT Filed: Dec. 25, 1985

[86] PCT No.: PCT/JP85/00710

§ 371 Date: Aug. 25, 1986

§ 102(e) Date: Aug. 25, 1986

[87] PCT Pub. No.: WO86/03918

PCT Pub. Date: Jul. 3, 1986

[30] Foreign Application Priority Data

Dec. 26, 1984 [JP] Japan .................. 59-273144

[51] Int. Cl.⁴ ............................. H04N 5/14
[52] U.S. Cl. .................. 358/213.11; 358/213.29; 358/213.27
[58] Field of Search ........ 358/213.11, 213.29, 358/213.27, 213.31, 213.15

[56] References Cited

U.S. PATENT DOCUMENTS 4,592,029  5/1986  Altmann ............... 358/213.11
4,638,354  1/1987  Denimal ............... 358/213.11
4,639,781  1/1987  Rucci ................. 358/213.29

FOREIGN PATENT DOCUMENTS 59-2849  6/1979  Japan .
56-128078  3/1980  Japan .

OTHER PUBLICATIONS

Barber, S., "Photon Counting with Avalanche Photodiodes", *Electronic Engineering*, May 1984, pp. 63–70.
Kamiya, T., "Possibility of Optical Devices", *Approach to Optical Computers*, IV-4, pp. 90–94, Mar. 1983.

*Primary Examiner*—Gene Z. Rubinson
*Assistant Examiner*—L. C. Schroeder
*Attorney, Agent, or Firm*—Saidman, Sterne, Kessler & Goldstein

[57] ABSTRACT

A solid state image sensor comprising a plurality of photosensors (8A) including a plurality of avalanche photodiodes (12A) arranged at least in the form of an one-dimensional array and delivering pulse signals each representing the number of photons incident to each of the photosensors; counters (10A) connected to the respective photosensors (8A) to count the pulse signals and hold the count value as a video output; a reset circuit (5) for resetting the counters (10A) to the initial states at a predetermined frequency; and a scanning circuit (14) for sequentially reading out the count value in the counters (10A). The counter (10A) counts the number of photons subjected to photoelectric conversion by the photodiode (12A) so that the video signal is directly derived in the form of a digital signal and thus the video signal with a high S/N ratio is obtained.

7 Claims, 20 Drawing Figures

SOLID STATE IMAGE SENSOR

TECHNICAL FIELD

The present invention relates to a solid state image sensor and more particularly to a solid state image sensor of the type in which an electrical signal obtained by photoelectric conversion is directly converted into a digital signal, so that light information obtained from all picture elements is derived as digital signal.

BACKGROUND ART

It is well known that degradation of S/N ratio can be reduced largely by transmitting and processing various signals in the form of digital signal. From this point of view, even in the case of an image sensor, attempts have been made to convert a video signal into a digital signal in a stage as early as possible so that various processings of digital signals are carried out in the succeeding stages.

In a prior art image sensor, however, even in a case that a signal obtained by photoelectric conversion is converted into a digital signal in an earlier stage, various analog information obtained from picture elements of a solid stage image sensor element is once derived from the elements as time sequential analog information, and then the analog information is converted into a digital signal through an analog-to-digital (A/D) converter. That is, as shown in FIG. 1A, an analog signal derived from an image pickup tube 2A is applied through a buffer amplifier 4A to an A/D converter 6A to obtain a digital signal. Alternatively, as shown in FIG. 1B, a signal derived from a solid state image sensor element 2B is applied through a buffer amplifier 4B to an A/D converter 6B to obtain a digital signal.

Video signals are processed in various manners, so that the processing as shown in FIG. 1A or 1B in which the video signal is processed after the signal is converted into the digital signal has a merit, but with the processing as shown in FIG. 1A or 1B, the processing of an analog signal in an image pickup element prior to the A/D conversion is carried out in a conventional manner and the problems there are left unsolved. As a result, there is a disadvantage that a high quality image cannot be picked up, since an S/N ratio cannot be improved to a satisfactory degree due to superposition of various noise.

DISCLOSURE OF THE INVENTION

In view of the above, one of the objects of the present invention is to provide a solid state image sensor in which an electrical signal obtained by photoelectric conversion at each picture element is directly derived in the form of a digital signal and then the digital signal is directly served for processing.

In order to acheive the above object, a solid state image sensor comprises:

a plurality of light receiving means arranged in the form of at least one dimension and each for delivering a pulse signal representative of the number of photons incident to each light receiving means;

a plurality of counting and holding means, each connected to a corresponding one of the light receiving means and for counting the pulse signals and for holding a count value as a video output;

means for resetting the count value of each of the plurality of counting and holding means to its initial state at a predetermined interval; and scanning means for sequentially reading out the count value from each of the counting and holding means.

Here, the solid state image sensor may comprise means for correcting the count value in accordance with a peak value or a time duration of the pulse signal, when photons are incident to the light receiving means simultaneously or within a short period of time.

Pulse signal correction means may be disposed between the light receiving means and the counting and holding means and for correcting the pulse signal from the light receiving means to a signal having a pulse width which is suitable for the counting by the counting and holding means.

Each of the plurality of light receiving means may include an avalanche photodiode or a micro-channel plate.

The plurality of light receiving means may be arranged in the form of two-dimension so that two-dimensional video information is obtained from the plurality of light receiving means.

A digital signal derived from the scanning means may be applied to a digital signal processing stage for changing a signal level of the digital signal so that a video output with a required dynamic range is obtained from the digital signal processing stage.

The above and other objects, effects, features and advantages of the present invention will become more apparent from the following description of preferred embodiments thereof taken in conjunction with the accompanying drawings.

BEST MODES FOR CARRYING OUT THE INVENTION

The present invention will become more apparent from the following description of some preferred embodiments thereof taken in conjunction with the accompanying drawings.

In a solid state image sensor in accordance with the present invention, the number of incoming photons is measured in a digital form so that a digital signal is derived from each picture element. Therefore, first the number of incoming photons will be discussed. It is reported that the number of photons contained in one lumen per second is $0.4 \times 10^{16}$/sec at the wavelength ($\lambda$) of 550 nm and is $1.3 \times 10^{16}$/sec in the case of white light. It follows, therefore, that when the size of a picture element is about $10 \times 10 \mu m^2$, the number of photons impinging against this picture element in an area having a plane illumination of one lux becomes in the case of white light.

$$1.3 \times 10^{16} \times 10 \times 10 \times 10^{-12}/\text{sec} = 1.3 \times 10^6/\text{sec} \quad (1)$$

In terms of the frame time (1/30 sec) of the conventional television system, it becomes $$\frac{1.3 \times 10^6}{30} = 4.3 \times 10^4 (/\text{frame} \cdot \text{one picture element}) \quad (2)$$

It becomes, therefore, possible to obtain a digital signal representative of an amount of light incident to the picture element by counting the number of photons.

The number of photons given by equation (2) is $4.3 \times 10^4 < 2^{16} = 6.55 \times 10^4$,
so that it can be expressed by a binary number consisting of 16 bits. In the case of the incident light whose light amount is 10 or 100 times as high as the above-described light amount, $$4.3 \times 10^{4+1} < 2^{19} (=5.24 \times 10^5)$$
and $$4.3 \times 10^{4+2} < 2^{23} (=8.39 \times 10^6).$$

Therefore, it becomes possible to represent the number of photons by binary numbers consisting of 19 bits or 23 bits.

Next, a frequency of photons striking a photosensor will be discussed. In the case of equation (1), the number of photons per second is $1.3 \times 10^{16}$/sec. If it is assumed that all the photons reach the photosensor at the same frequency, the frequency becomes 1.3 MHz. However, the striking frequency is in general considered to be at random, so that, at one time point, the frequency becomes 13 MHz in the case of the reception of photons at the density of 10 times higher and 130 MHz in the case of the reception of photons at the density of 100 times higher.

Figure 2:
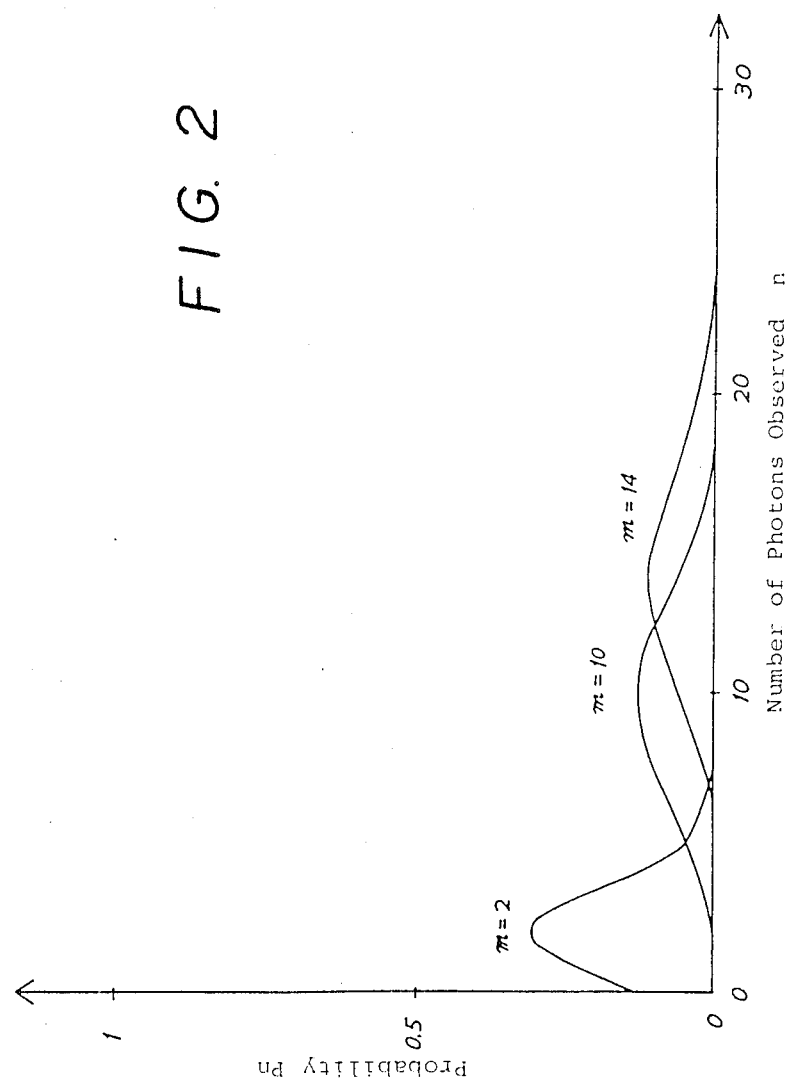
FIG. 2 is a graph illustrating a relationship between the number of observed photons and a probability of occurrence.

FIG. 2 illustrates a probability Pn of the number n of photons observed when the average number of incoming photons is m. The probability Pn is given by $$P_n = \frac{m^n}{n!} \exp(-m)$$

Figure 1:
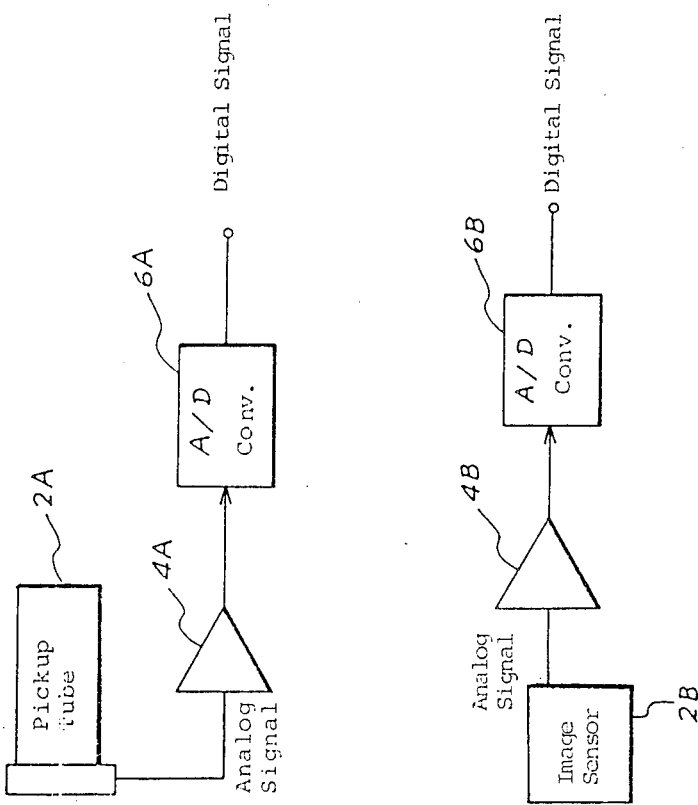
FIGS. 1A and 1B are block diagrams used to explain the prior art.

FIG. 2 is obtained by redrafting FIG. 1 in "Possibility of Optical Devices", Takeshi KAMIYA, "Approach to Optical Computers", (IV-4, p. 90+, March 1983), Communication Laboratories Symposium, the University of Tohoku. As is clear from this graph, it is sufficient that a frequency response performance for distinguishing photons incident at a certain time point has a margin of about 10 times at the most (that is, 13 MHz).

It is further considered that an incoming light has a noise component and that the incoming photons at a high density at one time point may be considered to correspond to such a noise component. It follows, therefore, that noise can be reduced to a minimum when all of the high density photons are not counted. Therefore, in view of the above, it is sufficient that the frequency response is ten times as high as an average frequency (1.3 MHz) and it is not needed to count photons at a frequency higher than the above-described frequency.

When it is required to count all of incident photons, a circuit for counting all incident photons can be provided in order to attain this counting, as will be described later.

Figure 3A:
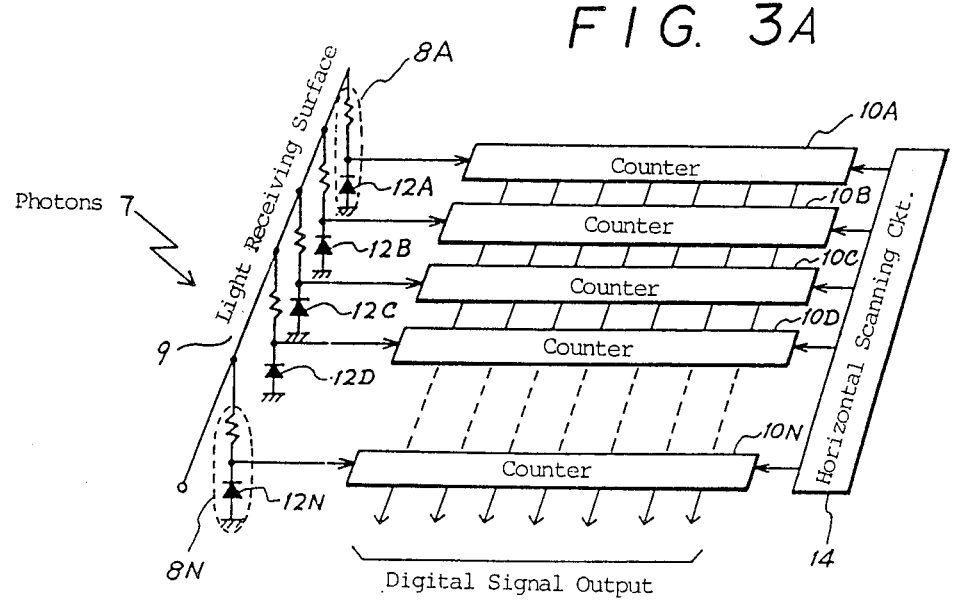
FIGS. 3A and 3B are schematic views showing a first embodiment of the present invention.
Figure 3B:
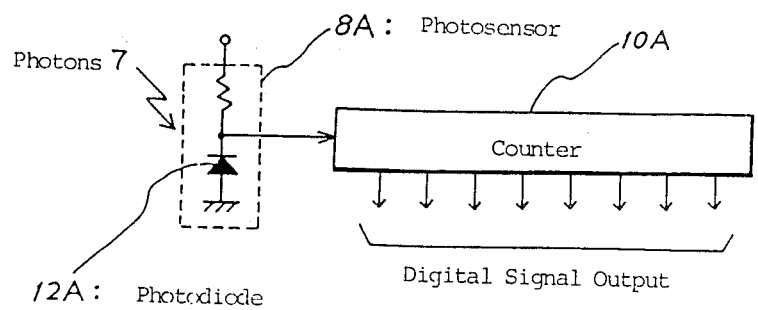
Figure 4:
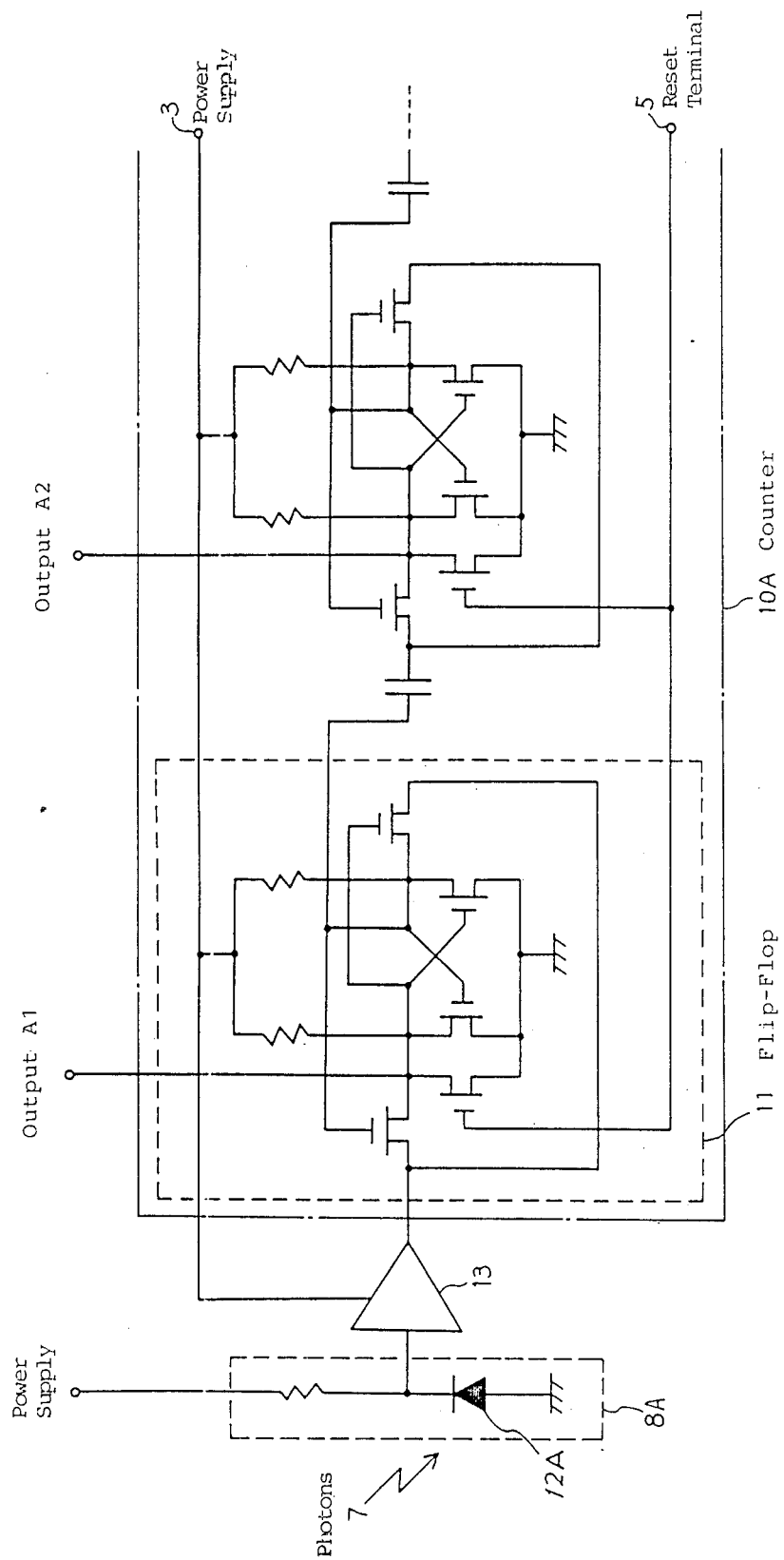
FIG. 4 is a circuit diagram showing an embodiment of a detailed circuit arrangement corresponding to FIG. 3B.

FIG. 3A is a schematic diagram showing a first embodiment of the present invention in which a line sensor is formed and arranged on a single wafer by a conventional IC production process. FIG. 3B shows photoelectric conversion means and counting and holding means in each picture element of the line sensor. In FIGS. 3A and 3B, reference numerals 8A-8N designate photosensors each for generating a pulse signal corresponding to the number of incident photons and 10A-10N denote 16-23-bit pulse counters for counting the pulse signals derived from the photo sensors 8A-8N, respectively. 12A-12B are high speed photoelectron multiplying devices (for instance, avalanche photodiodes) arranged in one row over a light receiving surface 9 against which photons impinge. Alternatively, a micro channel plate (MCP) may be disposed on the light receiving surface 9 so that the photons multiplied by the MCP are received by the photodiodes 12A-12N. In the latter case, a photo sensitivity can be remarkably increased.

Reference numeral 14 designates a horizontal scanning circuit for sequentially reading out the digital contents in the 16-23-bit counters 10A-10N when the counters are enabled. It is preferable to use a conventional address switching method in order to read out the contents by enabling the counters 10A-10N.

Thus, the first embodiment provides a one-dimensional solid state image sensor (a so-called line sensor).

Each of the counters 10A-10N can be constructed by connecting in cascade a plurality of flip-flops 11 each constituting one bit stage of the counter. Reference numeral 3 represents a power supply terminal; 5, a reset terminal; and 13, a buffer amplifier.

Next, the mode of operation of the first embodiment with the above-described arrangement will be described. First, within one frame time (1/30 second), the photodiodes 12A–12N generate the pulse signals which correspond in number to the incident photons. These pulse signals are applied to the counters 10A–10N and upon completion of counting incident photons, the horizontal scanning circuit 14 sequentially reads out the contents in the counters 10A–10N. Upon completion of reading out the pulse signals, the reset input is applied to the resent terminal 5 so that the counters 10A–10N are reset to zero. Thereafter, the same operations are repeated so that an illumination on the light receiving surface 9 is directly converted into a digital signals for each picture element and the digital signals are delivered to a succeeding stage.

Figure 5:
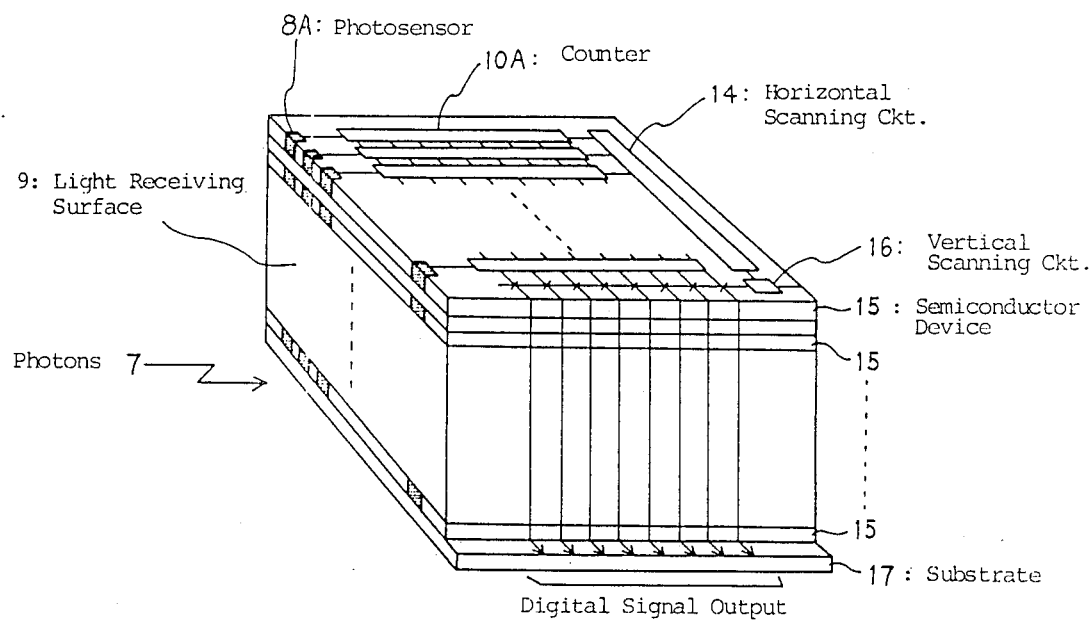
FIG. 5 is a schematic view showing a second embodiment of the present invention.

FIG. 5 shows schematically a second embodiment of the present invention. The line sensors with the arrangement described above with reference to FIG. 3A are integrally formed on a wafer as thin semiconductor devices 15 having a thickness of about 10 $\mu$m. A plurality of the semiconductor devices 15 are stacked on a substrate 17 and adhered to each other with adhesive such as electrically insulating organic adhesive to provide a sensor for pick up a two-dimensional object. Reference numeral 16 denotes a vertical scanning circuit 16 which sequentially designates the horizontal scanning circuits 14 on the respective semiconductor devices 15.

As described above, the photodiodes 8A are arranged in the form of a matrix array on the two-dimensional light receiving surface 9 and the semiconductor devices 15 are stacked while electrically isolated from each other, so that a two-dimensional scanning can be carried out in a usual manner.

In the second embodiment, the counters 10A for counting the number of incident photons are arranged in a three-dimensional manner, so that not only the horizontal and vertical scanning circuits 14 and 16 but also other necessary signal processing circuits can be disposed adjacent to the counters 10A, for instance, in the space on the righthand side in FIG. 5. This arrangement is very advantageous when the signal processing circuits must be provided for respective picture elements.

Figure 6:
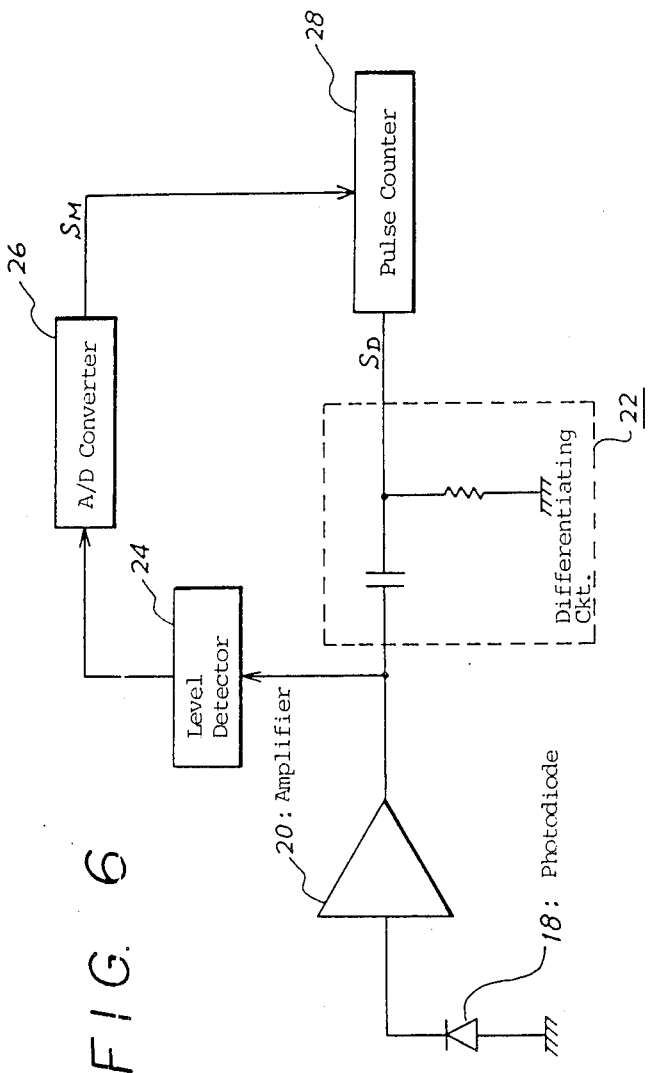
FIG. 6 is a block diagram showing a third embodiment of the present invention.

FIG. 6 is a block diagram showing a third embodiment of the present invention which is very useful especially when the number of pulses corresponding to the number of photons incident to the respective photosensors cannot be obtained because a large number of photons are incident at one time. Here, reference numeral 18 denotes an avalanche photodiode; 20, a wide-band amplifier; and 22, a differentiating circuit. Reference numeral 24 denotes a level detector which detects a level component in excess of a predetermined level of the output signal from the amplifier 20 and transmits the level component to an A/D converter 26. Reference numeral 28 denotes a pulse counter for counting pulses $S_D$ derived from the differentiating circuit 26. When pulses $S_M$ are supplied to the counter 28 from the A/D converter 26, the count of the counter 28 is incremented by the number of the pulses $S_M$.

So far, the third embodiment has been described with respect to one picture element. Therefore, the photodiodes 18 can be arranged in one row as shown in FIG. 3A or in a two-dimension fashion as shown in FIG. 5 so that various photosensors can be provided.

Figure 7:
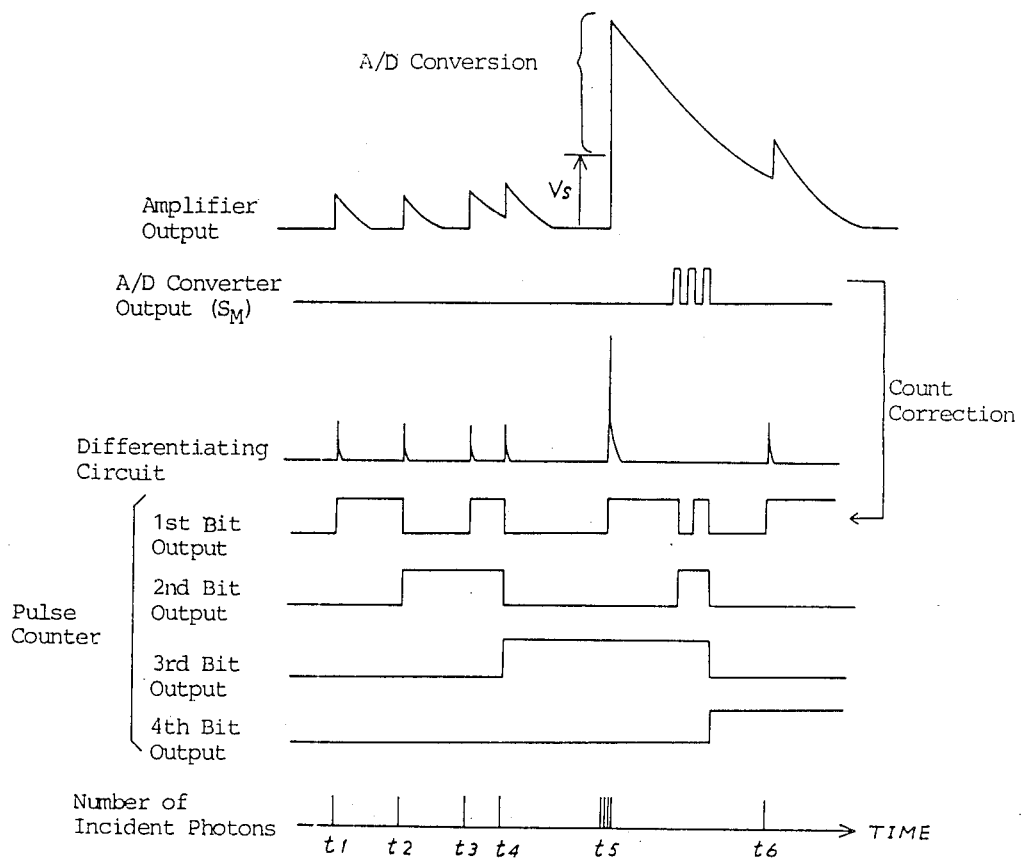
FIG. 7 illustrates signal waveforms used to explain a mode of operation of the third embodiment shown in FIG. 6.

FIG. 7 illustrates signal waveforms used to explain the mode of operation of the third embodiment shown in FIG. 6. FIG. 7 shows the output signal derived from the wide-band amplifier 20; the output signal $S_M$ derived from the A/D converter 26; the output signal $S_D$ derived from the differentiating circuit 22; respective bit outputs derived from the pulse counter 28; and the number of photons incident to the photodiode 18 according to the lapse of time in the order named above in the vertical direction. The pulse counter 28 has four bits in this illustration.

As is apparent from FIG. 7, the number of incident photon is one at instants t1–t4 and the output pulses $S_D$ from the differentiating circuit 22 are sequentially counted by the pulse counter 28. When four photons are incident at instant t5, an output signal in excess of a threshold voltage Vs is derived from the wideband amplifier 20. When the level detector 24 detects the output signal in excess of the threshold voltage $V_S$, the level detector 24 applies an excess voltage obtained by subtracting the threshold voltage Vs from the output signal derived from the wide-band amplifier 20 to the A/D converter 26. The A/D converter 26 converts the excess voltage into the digital signal $S_M$ representing three photons which in turn is applied to the input terminal of the pulse counter 28; that is, to the input terminal of the first bit stage of the counter 28. As a result, the count in the pulse counter 28 is incremented by "3" and represents the number of incident photons.

So far, the third embodiment has been described in conjunction with the photons incident to one picture element, but it is to be understood that in response to the photons incident to other picture elements not shown similar operations are carried out.

Figure 8:
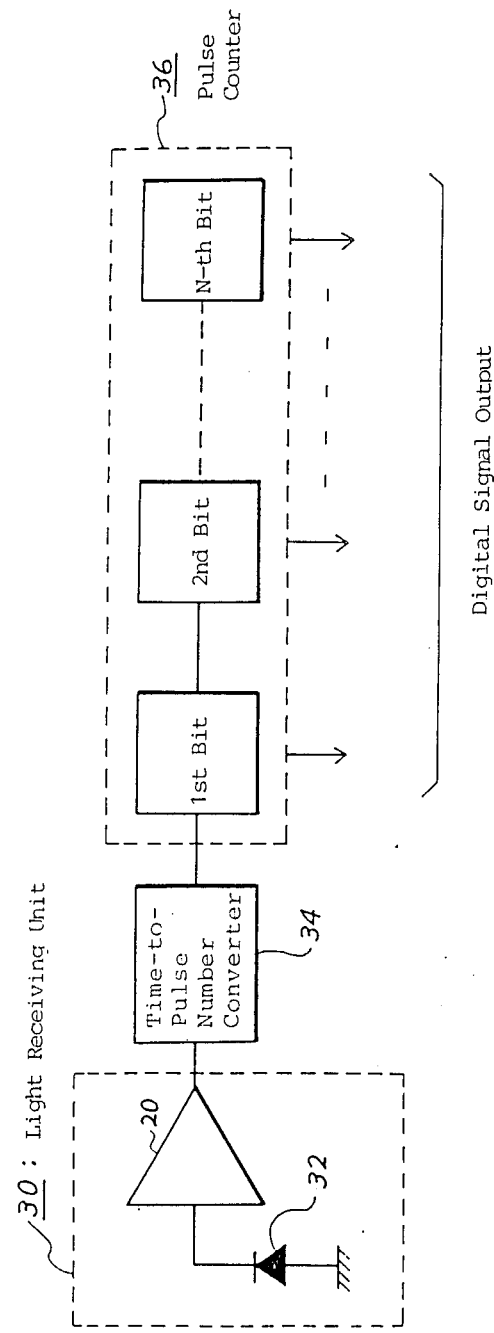
FIG. 8 is a block diagram showing a fourth embodiment of the present invention.

FIG. 8 is a block diagram showing a fourth embodiment of the present invention. In FIG. 8, reference numeral 30 represents a light receiving unit including an avalanche photodiode 32 and a wide-band amplifier 20. Reference numeral 34 denotes a time-to-pulse number converter for converting a time interval during which the output signal derived from the amplifier 20 is in excess of a predetermined level Eo into the number of pulses (corresponding to the number of incident photons) corresponding to the time interval. Reference numeral 36 denotes an N-bit pulse counter for counting the output pulses from the converter 34.

Figure 9:
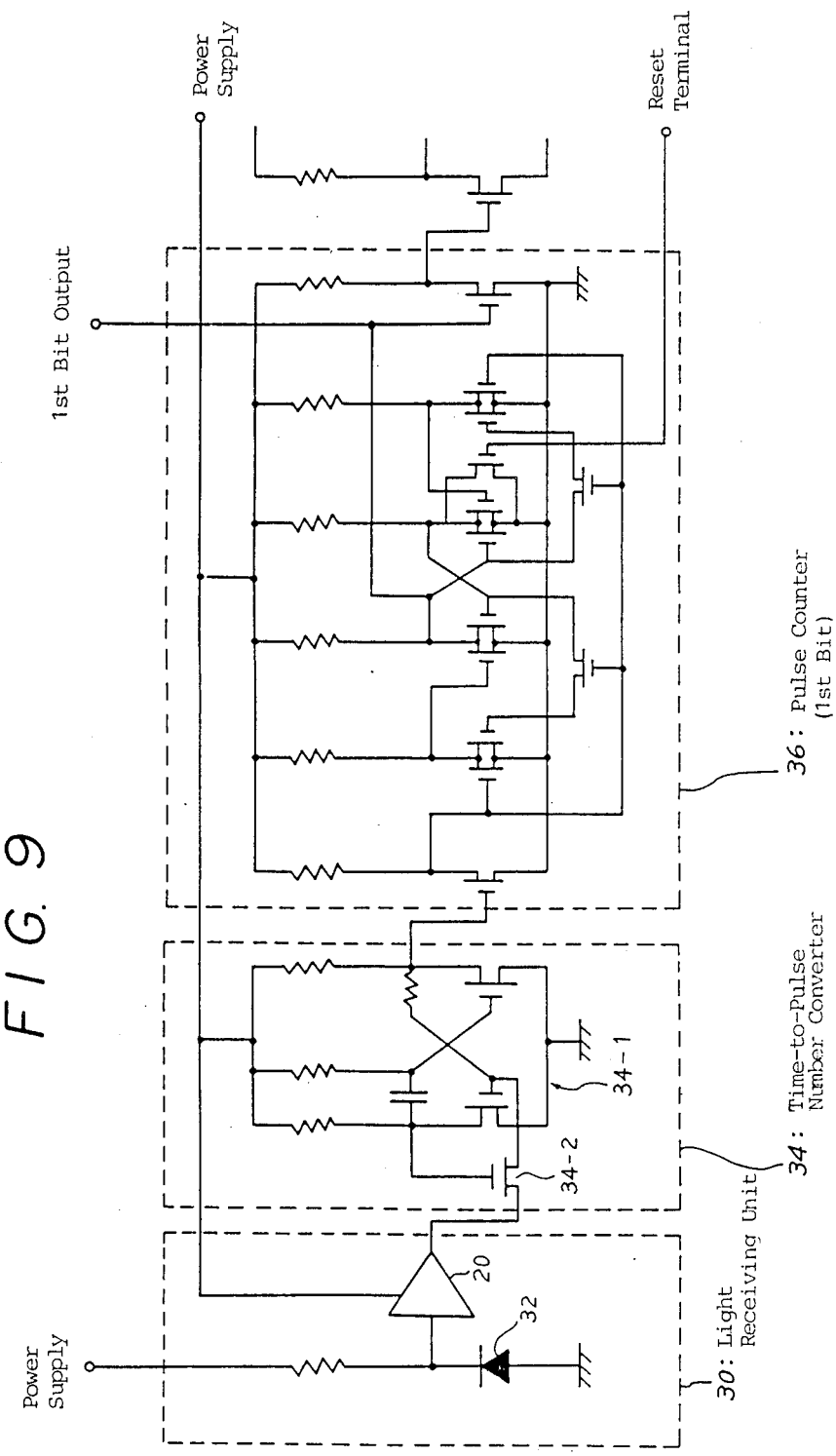
FIG. 9 is a circuit diagram showing an embodiment of a detailed circuit arrangement of the circuit shown in FIG. 8.
Figure 10:
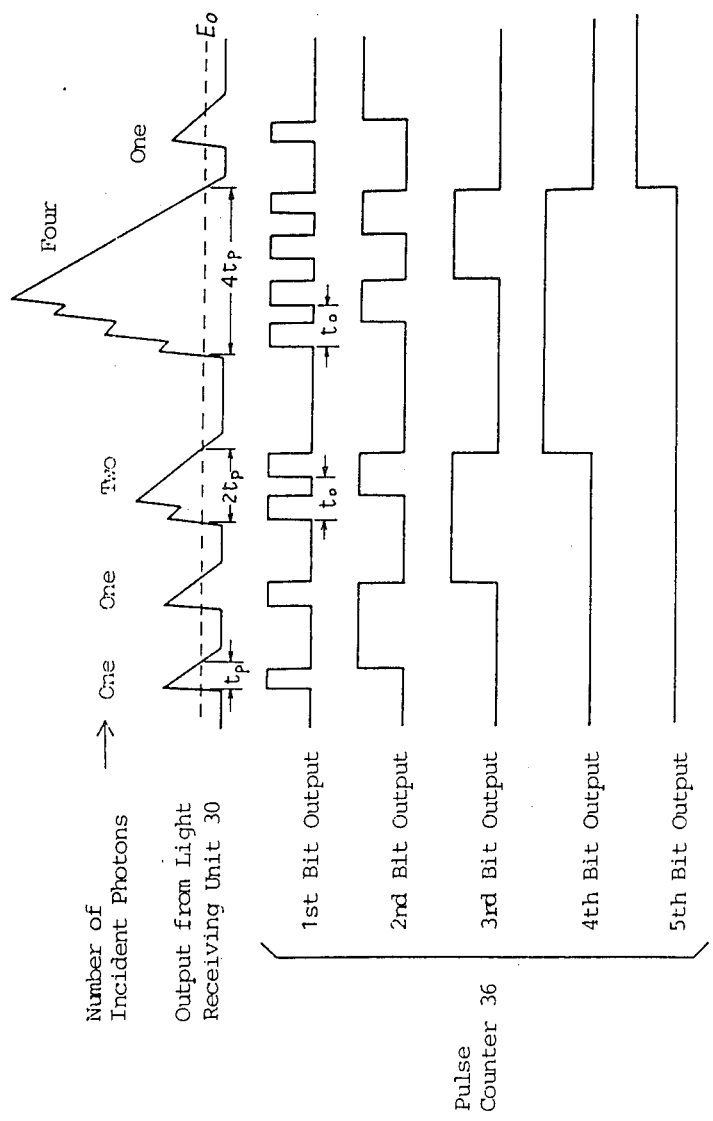
FIG. 10 illustrates signal waveforms used to explain a mode of operation of the fourth embodiment shown in FIG. 9.

Next, the mode of operation of the fourth embodiment shown in FIG. 8 will be described in detail with further reference to FIGS. 9 and 10. FIG. 9 shows a detailed circuit corresponding to the fourth embodiment shown in FIG. 8. FIG. 10 illustrates signal waveforms used to explain the mode of operation of the fourth embodiment shown in FIG. 8.

In response to the photons incident to the light receiving unit 30, a photo-multiplied output is derived from the avalanche diode 32. The light receiving unit 30 is so designed and constructed as to satisfy the following conditions:

(1) The light receiving unit 30 is so adjusted in advance that even when a single photon is incident, it maintains an output level larger than the predetermined threshold level Eo (that is, a trigger level of the converter 34) for a predetermined period of time $t_p$.

(2) When a large number of photons simultaneously strike the light receiving unit 30, the unit 30 delivers an output having a level larger than the level Eo for a period of time $P \cdot t_p$ in proportion to the number P of incident photons as shown in FIG. 10. This condition can be satisfied when frequency characteristics of the photodiode 32 and the amplifier 20 of the light receiving unit 30 are suitably determined.

The time-to-pulse number converter 34 can be arranged as shown in FIG. 9 and can comprise a self-excited circuit such as a monostable multivibrator 34-1 which generates a pulse at a time interval to slightly longer than the above-described time interval $t_p$ and an oscillation control circuit 34-2 which enables the monostable multivibrator 34-1 only when the output from the light receiving unit 30 exceeds the threshold value Eo. Therefore, as shown in FIG. 10, only when the input from the light receiving unit 30 is in excess of the level Eo, the converter 34 continuously outputs the pulses with a pulse interval $t_o$. As a result, the time-to-pulse number converter 34 delivers the pulses, the number of which corresponds to the number of incident photons and which are counted by the pulse counter 36.

As described above, when the photons strike the light receiving unit 30 separately in a scattered manner, each photon is counted, and when a large number of photons are incident simultaneously, the number of incident photons is converted into an analog value; that is, an interval of time, so that the number of pulses corresponding to the time interval is counted. As a result, the number of photons can be always counted correctly. It is preferable to set the above-described time interval $t_p$ or $t_o$ less than, for instance, 0.1 μsec.

It has been reported that the limit of a contrast ratio of an image displayed by a cathode ray tube (CRT) is 20:1 and can be attained satisfactorily by a video signal with 8 bits in terms of a binary number; that is, with tones of $2^8$. Therefore, various characteristics can be obtained in accordance with various manners how an output of $2^{23}$ tones obtained from the digital solid state image sensor in accordance with the present invention corresponds to a video signal.

Figure 11:
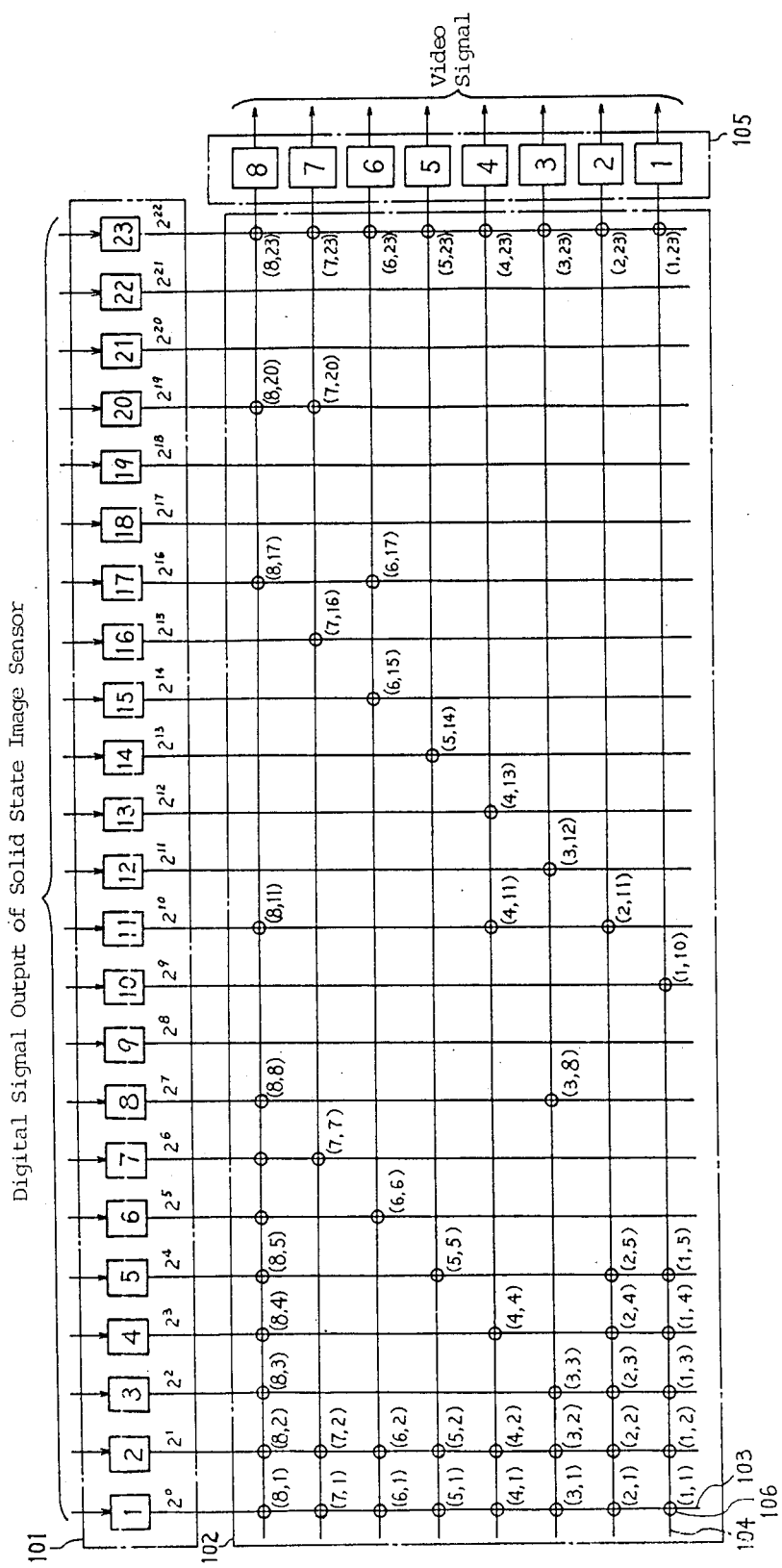
FIG. 11 is a block diagram showing a specific embodiment for obtaining various characteristics.

FIG. 11 shows an example of a circuit for obtaining a video signal with a desired tone from the digital signal output of solid state image sensor. In FIG. 11, 23 bit outputs from the digital solid state image sensor are applied through a terminal 101 having 23 ports to respective vertical lines 103 of a switch matrix 102. Respective horizontal lines 104 of the switch matrix 102 are connected to corresponding ones of 8 ports of an output terminal 105 from which a video signal is obtained. In the switch matrix 102, switches 106 are disposed at respective intersections between the vertical and horizontal lines 103 and 104 and a desired switch 106 is closed in accordance with various characteristics to be described below to determine correspondence between tones of a digital signal output of solid state image sensor and tones of a video signal. For the sake of explanation, suffixes representative of intersections between the vertical and horizontal lines 103 and 104 are affixed to the switches 106.

Next, examples of the signal level conversion will be described.

Figure 12:
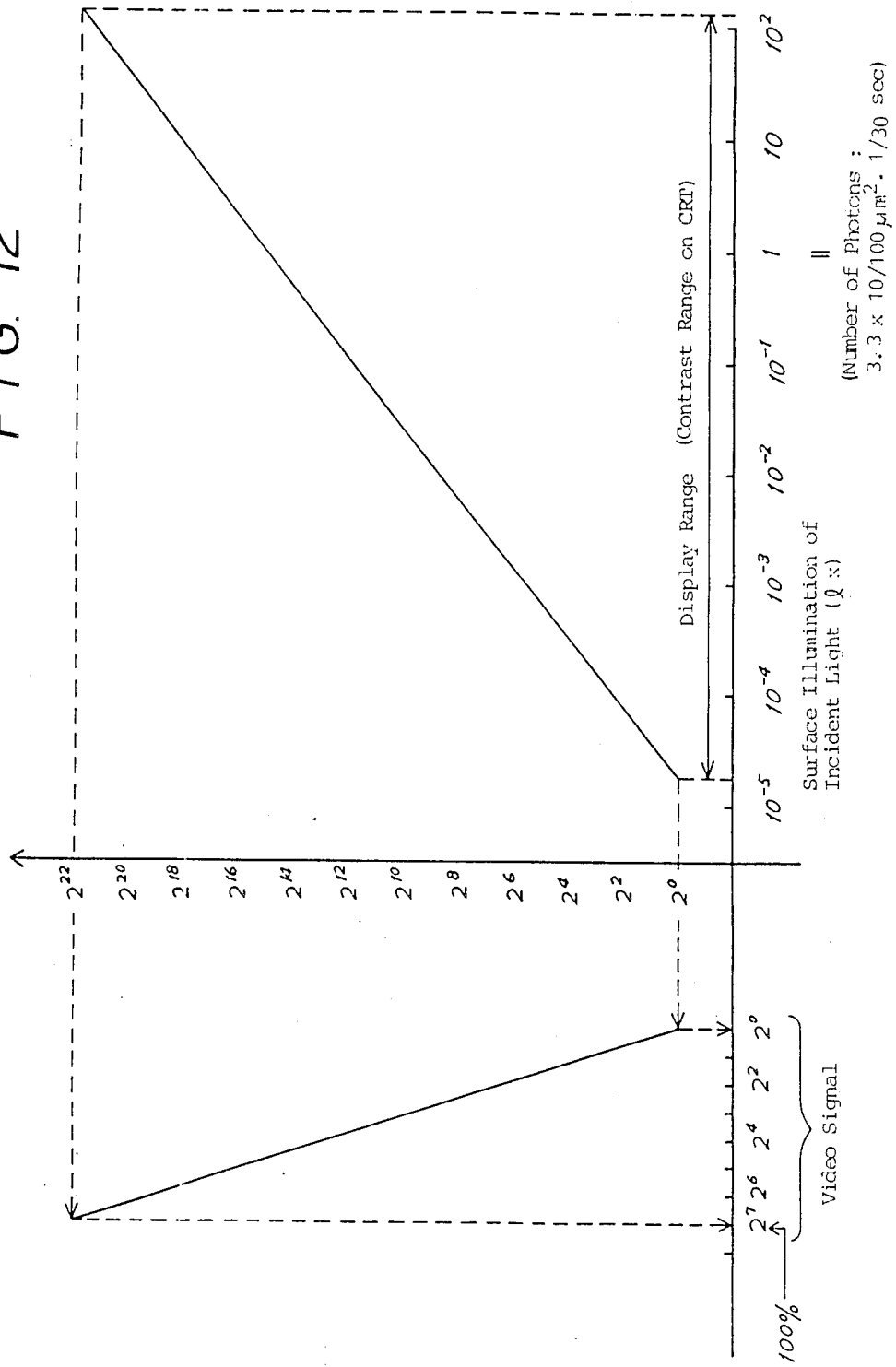
FIG. 12 illustrates characteristic curves used to explain an embodiment of the present invention in which the whole range ($2^{22}$) of a digital signal output of solid state image sensor corresponds to the 8th bit of a video signal.

(1) In the case of an example as shown in FIG. 12, an output with $2^{23}$ tones from the digital solid state image sensor is linearly converted into a video signal with $2^8$ tones. In this case, the switches 106 (1,1), (2,5), (3,8), (4,11), (5,14), (6,17), (7,20) and (8,23) are closed.

In general, a contract ratio of an ordinary scene in the natural world is 100:1 and 1000:1 at the highest. In this case, the scene is compressed within an extremely limited contrast range on the screen of a cathode ray tube (CRT), and hence the above-described conversion system is not satisfactory and its use is limited to a special purpose.

Figure 13:
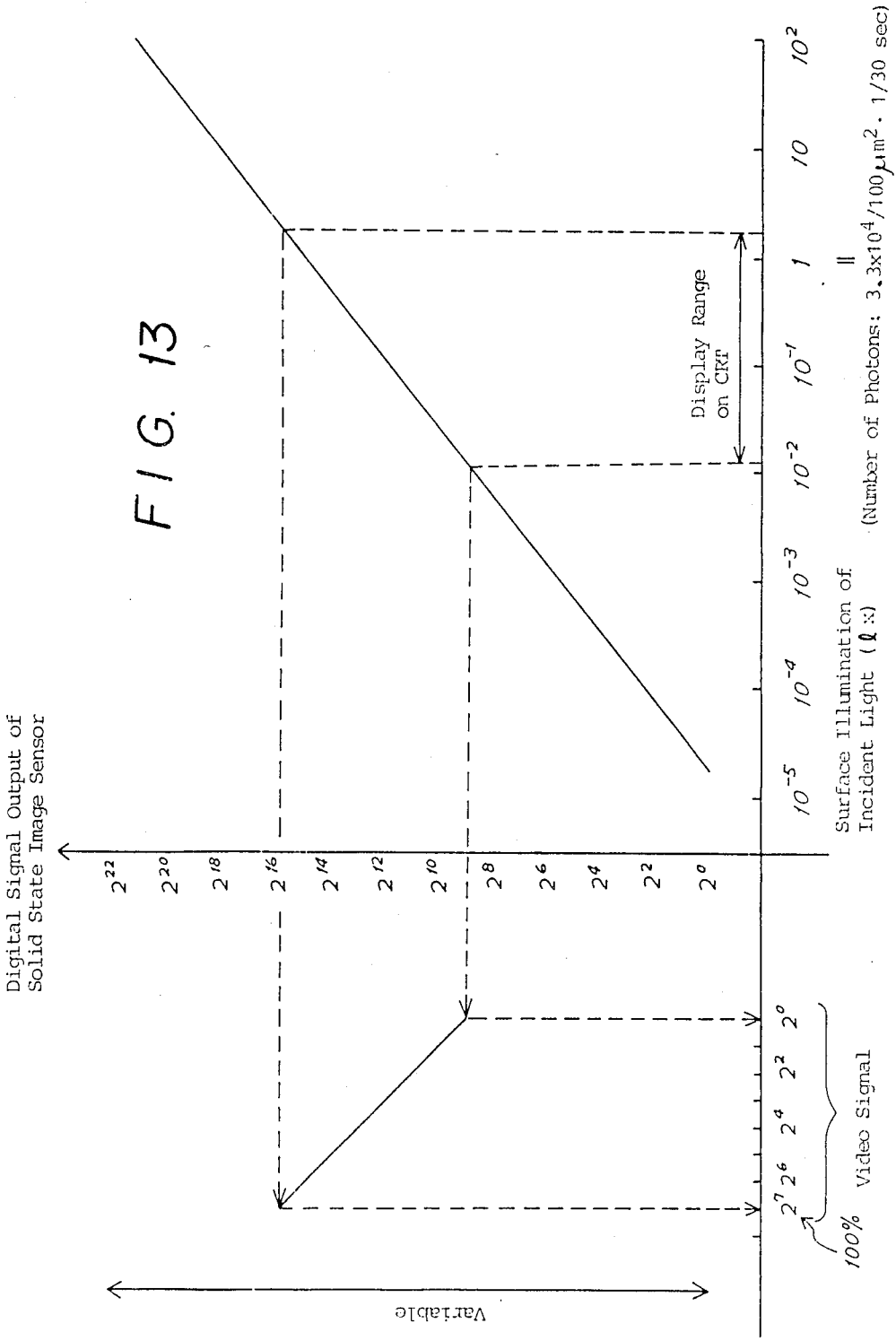
FIG. 13 illustrates characteristic curves used to explain an embodiment in which the 16th bit of a digital signal output of solid state image sensor corresponds to 100% of a video signal.
Figure 14:
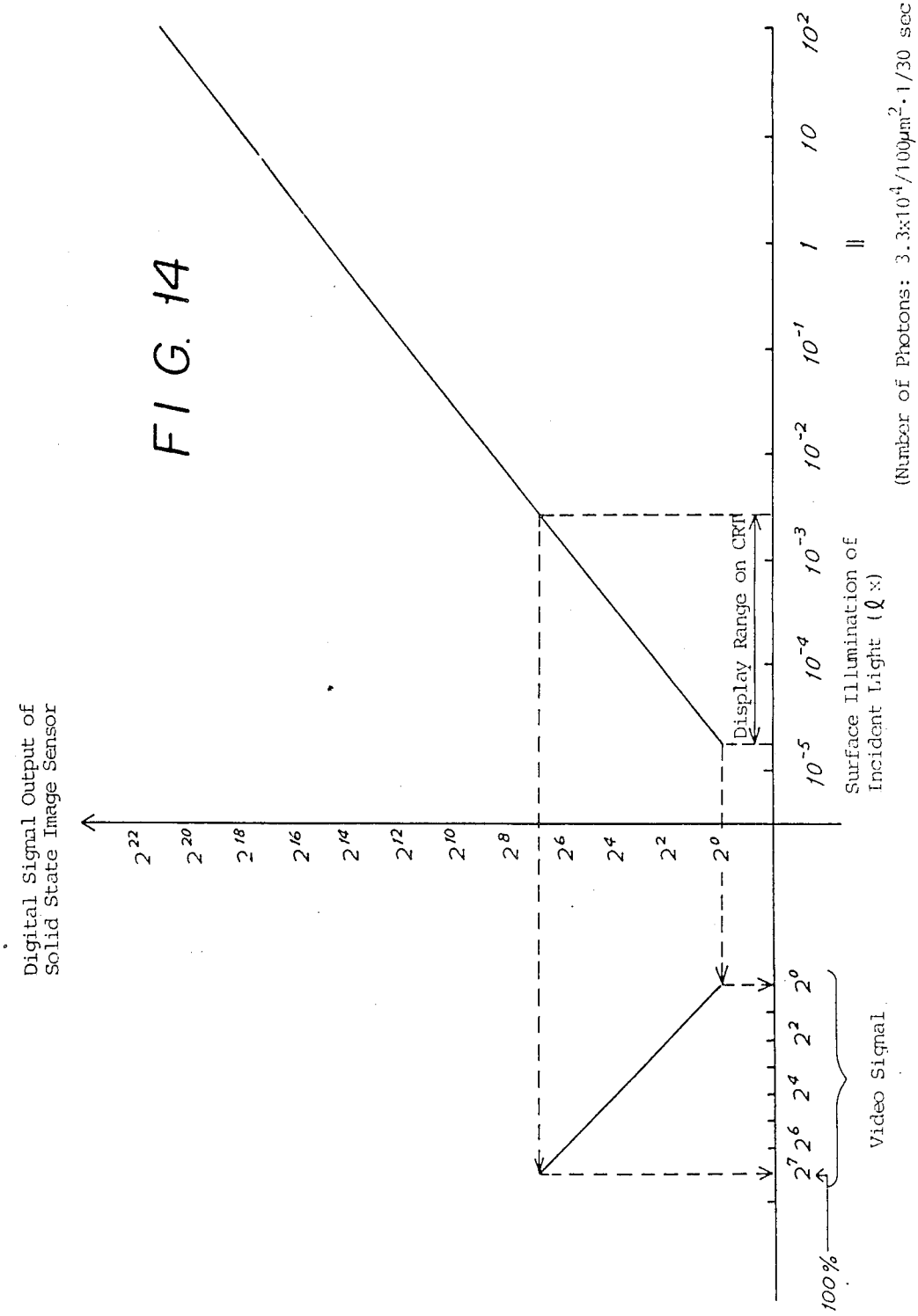
FIG. 14 illustrates characteristic curves used to explain an embodiment in which the 7th bit of a digital signal output of solid state image sensor corresponds to 100% of a video signal.

(2) In the cases of examples as shown in FIGS. 13 and 14, each of 8 bits at predetermined positions of the binary the digital signal outputs of solid state image sensor is made to correspond to each of 8 bits of a binary video signal. In addition, the upper and lower bits which are out of the correspondence range are omitted. In this case, in response to brightness of an object, a manner of correspondence of 8 bits out of the outputs with as high as $2^{23}$ tones from the digital solid state image sensor to the video signal can be varied.

In the case of the example as shown in FIG. 13, the switches 106 (1,10), (2,11), (3,12), (4,13), (5,14), (6,15), (7,16) and (8,17) are closed.

In the case of the example as shown in FIG. 14, the switches 106 (1,1), (2,2), (3,3), (4,4), (5,5), (6,6), (7,7) and (8,8) are closed.

According to these examples, an image can be displayed on the screen of a cathode ray tube (CRT) with a contrast substantially the same as in the natural world, so that the video signal is satisfactorily obtained.

Figure 15:
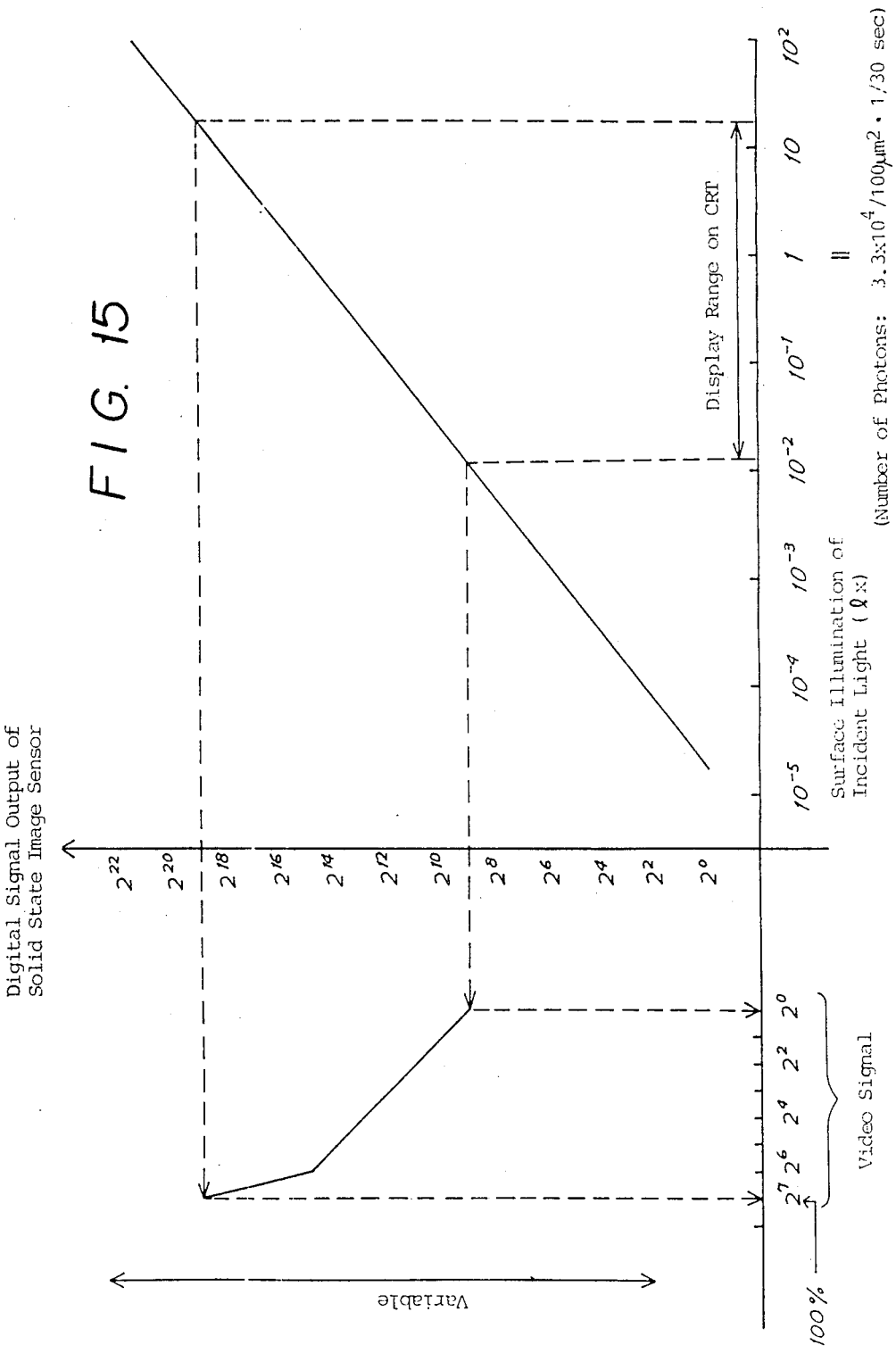
FIGS. 15 and 16 illustrate characteristic curves used to explain embodiments in which a knee point is provided in a high illumination portion of an object.
Figure 16:
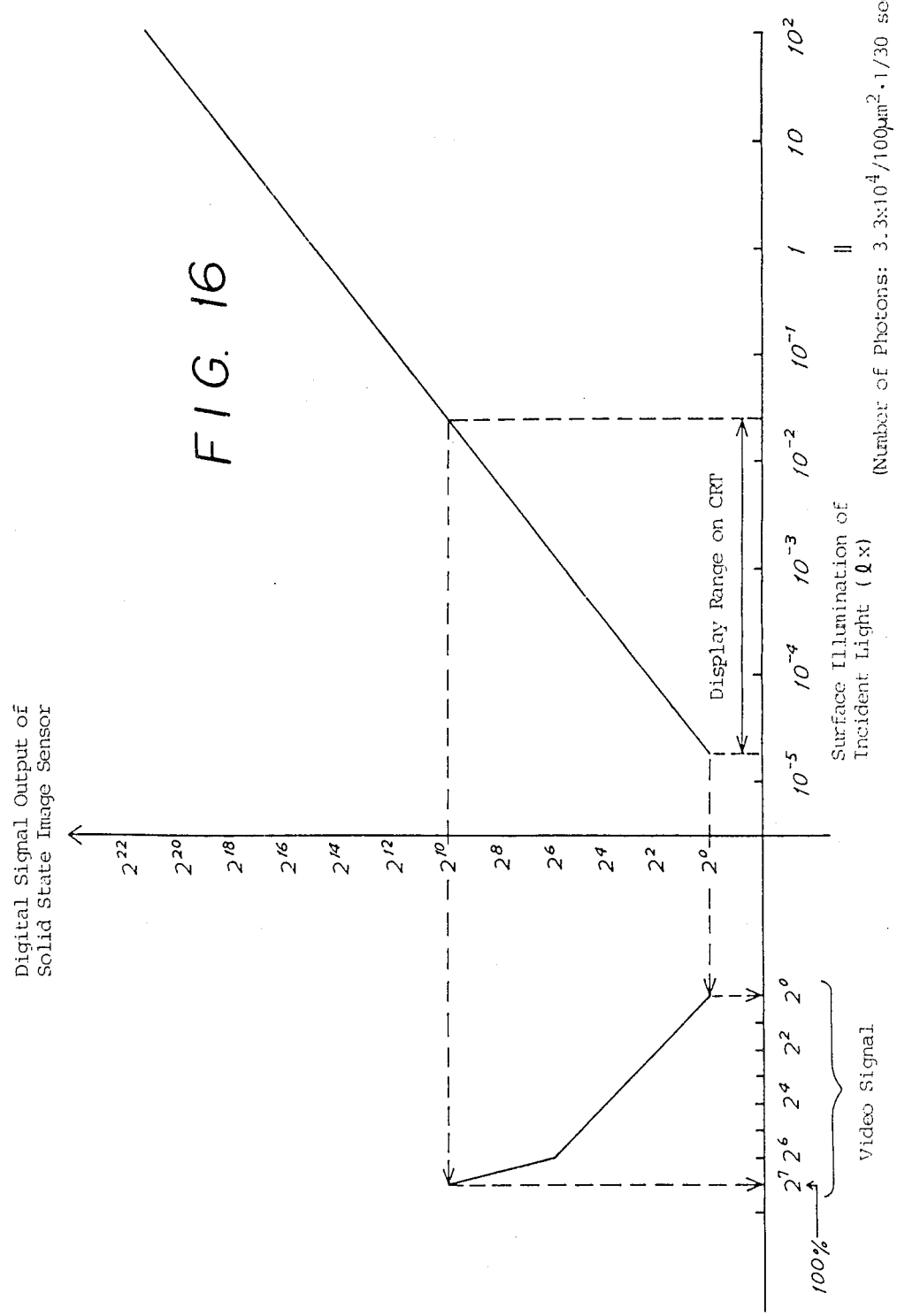

(3) In the cases of examples as shown in FIGS. 15 and 16, one-to-one correspondence is established between predetermined bits of the video signal and the digital signal output of solid state image sensor in a manner substantially similar to that described above, so that a contrast only of a portion of an object having a high degree of brightness is compressed. In other words, a knee point is provided to perform the compression in the case of conversion into the video signal.

In the case of the example as shown in FIG. 15, the switches 106 (1,10), (2,11) (3,12), (4,13), (5,14), (6,15), (7,16) and (8,20) are closed.

In the case of the example as shown in FIG. 16, the switches 106 (1,1), (2,2), (3,3), (4,4), (5,5), (6,6), (7,7) and (8,11) are closed.

Like the cases described above, corresponding bits can be varied in response to an amount of incident light without changing the compression ratio. The examples as shown in FIGS. 15 and 16 can express an image with a wider range of light amount than the range obtained by the examples shown in FIGS. 13 and 14.

Figure 17:
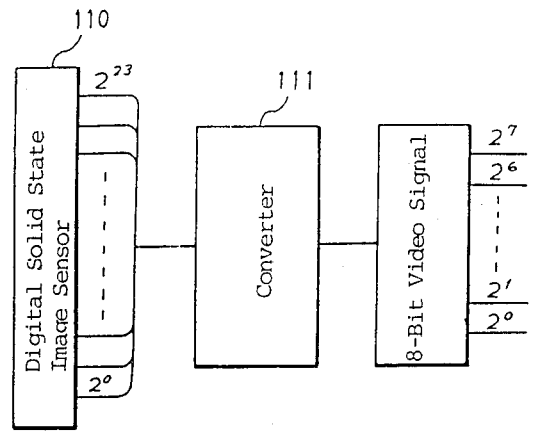
FIGS. 17 and 18 are block diagrams showing embodiments for attaining the characteristics illustrated in FIG. 15.
Figure 18:
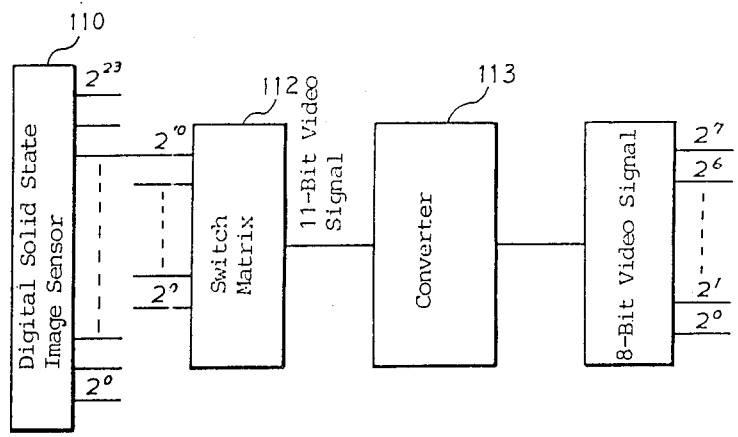

Next, as to a method of signal conversion, the following methods may be considered. In one method, as shown in FIG. 17, 10–11 bits of a 23 bit output from a digital solid state image sensor 110 are directly converted into an 8 bit video signal by a converter 111. In another method, as shown in FIG. 18, 10–11 bits of the 23 bit outputs from the digital solid state image sensor 110 are applied to a switch matrix 112 which is substantially similar in construction to that described above in item (2) and a 10–11 bit video signal is derived from the switch matrix 112 and then compressed into an 8-bit video signal by a modulator 113

The above-described example in item (2) will be described in more detail with specified values. In general, one lumen (lm) of white light contains about $10^{16}$ photons per second. One lux is defined to be equal to the illumination of a surface of 1 square meter in area against which these photons impinge.

When it is assumed that one picture element of a photosensor has an area of $10 \times 10$ μm², about $10^6$ photons per second arrive at the area of 100 μm² at one lux. Then within 1/30 second, about $3.3 \times 10^4$ photons arrive at the picture element and in order to count them, a 16-bit counter is required. When the 16-th bit of a counted value is made to correspond to the level of 100% tone of a video signal, the video signal with 100% tone can be obtained at surface illumination of 1 lux (See FIG. 13). When an amount of incident light is decreased, the 100% level of the video signal is made to correspond to the 15-th bit of the digital signal output of solid state image sensor, so that the sensitivity can be increased twice as high. On the other hand, when an amount of light is too large, the 100% level of the video signal is made to correspond to the 17-th bit of the digital signal output of solid state image sensor, so that the sensitivity can be reduce to one half ($\frac{1}{2}$). In this manner, a sensitivity to incident light can be varied depending upon which bit of the digital signal output of solid state image sensor being made to correspond to the 100% level of the video signal.

POSSIBLE APPLICATIONS IN THE INDUSTRY

As is apparent from the above, the present invention can attain the following advantageous effects:

(1) The degradation of an S/N ratio due to switching noise and stray capacitance can be eliminated.

That is, according to the present invention, the number of photons which arrive at each picture element can be immediately counted per picture element, so that a digital signal thus obtained contains no noise component except a photon noise component. As a result, during the transmission and various signal processing, the possibility of picking up noise is extremely low because a digital signal is processed. Thus, an output signal with an extremely high S/N ratio can be obtained at the last stage.

Photon noise which causes some problems in the last stage can be further reduced by the following methods:

(A) Photons are stored for a period of time longer than a storage time required for each picture element (for instance, 1/30 sec), so that they are averaged.

(B) A simple arithmetic mean between the number of photons counted in the preceding frame and the number of photons counted in the succeeding frame is obtained.

(C) Each frame is weighted and a shift mean of the preceding N frames is obtained.

(2) The number of photons arriving at each picture element are treated as a digital signal, so that video information in the preceding frame can be completely cleared and consequently no afterimage remains at all.

(3) The number of photons arriving at each picture element can be stored as a digital signal and transmitted as a digital signal, so that blooming and smear can be completely eliminated and consequently an extremely high quality image can be obtained.

More particularly, it is possible to completely eliminate blooming which is caused in the storage and integration steps for each picture element, because:

(A) An insulating layer is interposed between the adjacent line-like photosensors for obtaining each scanning line information;

(B) A partition wall is disposed between the adjacent picture elements in the horizontal direction so that the leakage of charge is interrupted; and (C) Charge produced in response to incident photons is immediately absorbed by the power supply.

It is also possible to completely eliminate smear caused during the scanning and readout steps of the video signal, because (A) It is possible to dispose scanning circuits independently; and (B) The number of photons falling upon each picture element is derived in the form of a digital signal, so that the leakage of the signal and the interference of the signal with other signals can be satisfactorily compensated.

(4) Even when an amount of incident light is decreased (that is, when an image of a dark object is picked up), the number of incident photons is decreased accordingly, so that noise other than photon noise is picked up and consequently an S/N ratio which is substantially equal to a theoretical limit can be obtained.

(5) Even when a plurality of photons are incident to a photosensor simultaneously or within a short period of time, the signal processing circuit can be so designed and constructed to count the incident photons accurately.

(6) By changing the connections of the digital signal outputs of solid state image sensor, it becomes possible to vary a light sensitivity in terms of illumination on the surface of a photosensor within a range of about $2^{12}$ times and no degradation of an image quality will occur due to the solid state image sensor. When the number of incident photons is decreased, the degradation of the S/N ratio could be resulted, but this degradation is not caused by the solid state image sensor at all.

Specific data such as an amount of incident light, the number of incident photons, the number of bits in a counter and so on are shown in Table 1.

TABLE 1

| surface illumination | the number of photons arriving at a surface of 100 $\mu m^2$ in area per second | the number of photons per 1/30 sec | Required number of bits | conditions of a corresponding object |
|---|---|---|---|---|
| 100 lx | $10^8$ | $3.3 \times 10^6$ | 22 bits | under sun light, F16 |
| 10 lx | $10^7$ | $3.3 \times 10^5$ | 19 bits | |
| 1 lx | $10^6$ | $3.3 \times 10^4$ | 16 bits | |
| 0.1 lx | $10^5$ | $3.3 \times 10^3$ | 12 bits | |
| 0.01 lx | $10^4$ | $3.3 \times 10^2$ | 9 bits | moon light, F1.4 |

The above data are obtained on the assumption that one lumen of white light contains about $10^{16}$ photons. The light receiving surface of each picture element is $10 \times 10$ $\mu m^2$.

As is apparent from Table 1, the light sensitivity can be varied over a wide range simply by changing the order of bits used, so that an image of an object can be picked up under lighting conditions from sun light to moon light, without deterioration of images due to the image sensor.

I claim:

1. A solid state image sensor comprising:
   a plurality of light receiving means arranged in the form of at least one dimension and each for delivering a pulse signal representative of the number of photons incident to each light receiving means;

a plurality of counting and holding means, each connected to a corresponding one of said light receiving means and for counting said pulse signals and for holding a count value as a video output;

means for resetting said count value of each of said plurality of counting and holding means to its initial state at a predetermined interval; and scanning means for sequentially reading out said count value from each of said counting and holding means.

2. A solid state image sensor as claimed in claim 1, further comprising means for correcting said count value in accordance with a peak value or a time duration of said pulse signal, when photons are incident to said light receiving means simultaneously or within a short period of time.

3. A solid state image sensor as claimed in claim 1, further comprising pulse signal correction means disposed between said light receiving means and said counting and holding means and for correcting said pulse signal from said light receiving means to a signal having a pulse width which is suitable for the counting by said counting and holding means.

4. A solid state image sensor as claimed in claim 1, wherein each of said plurality of light receiving means includes an avalanche photodiode.

5. A solid state image sensor as claimed in claim 1, wherein each of said plurality of light receiving means includes a micro-channel plate.

6. A solid state image sensor as claimed in claim 1, wherein said plurality of light receiving means are arranged in the form of two-dimension so that two-dimensional video information is obtained from said plurality of light receiving means.

7. A solid state image sensor as claimed in claim 1, wherein a digital signal derived from said scanning means is applied to a digital signal processing stage for changing a signal level of said digital signal so that a video output with a required dynamic range is obtained from said digital signal processing stage.

* * * * *